March 1, 1960  E. H. PRYDE  2,926,989
PREPARATION OF SODIUM BOROHYDRIDE
Filed May 2, 1952
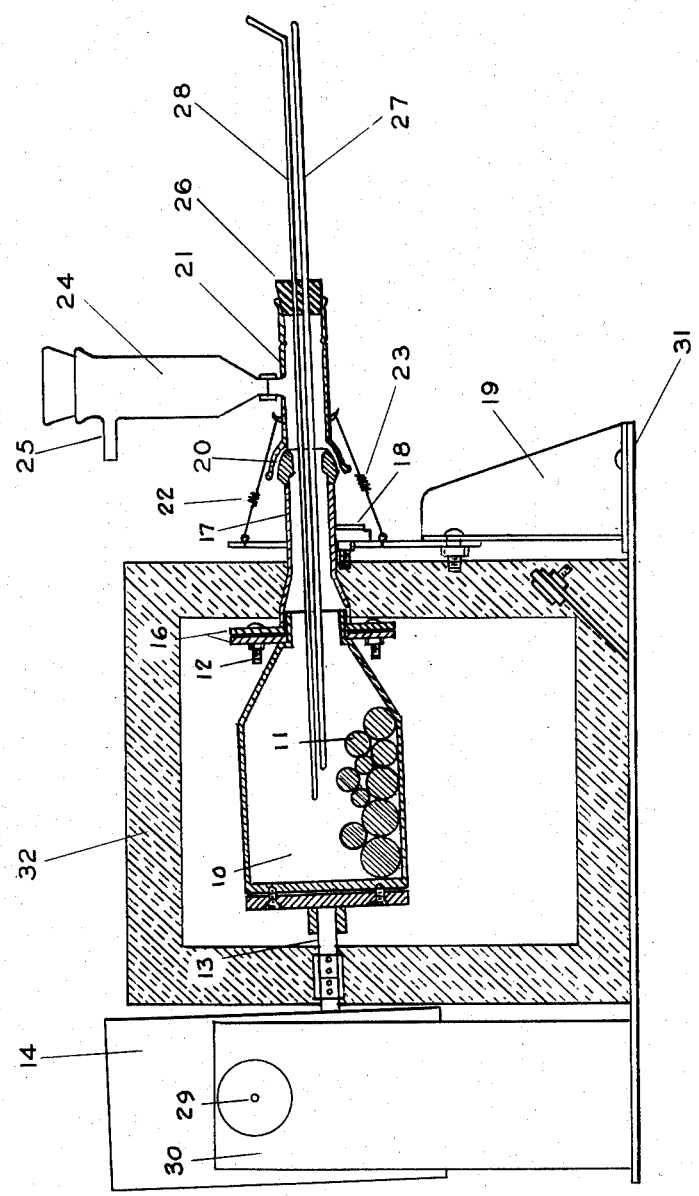
INVENTOR.
EVERETT H. PRYDE
BY James H. Ryan
ATTORNEY

2,926,989
PREPARATION OF SODIUM BOROHYDRIDE

Everett H. Pryde, Kenmore, N.Y., assignor to E. I. du Pont de Nemours and Company, Wilmington, Del., a corporation of Delaware Application May 2, 1952, Serial No. 285,771

2 Claims. (Cl. 23—14)

This invention relates to the preparation of sodium borohydride.

U.S. Patent 2,534,533 to Schlesinger and Brown discloses the reaction between a metallic hydride and boric oxide to produce the borohydride of the metal. The illustration of the reaction given by the inventors may be represented by the equation:

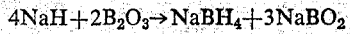

$$4NaH + 2B_2O_3 \rightarrow NaBH_4 + 3NaBO_2$$

The primary conditions shown by the patent as desirable in carrying out this reaction are a temperature of about 300–375° C. and a reaction time of 46 hours or more. The equation set forth is apparently based on research disclosed in more detail in the "Final Report to the Signal Corps Ground Signal Agency on Contract W.3434–S.C.–174," by H. I. Schlesinger, P.B. 6331. The final report gives more information than the patent and states that a yield of 64% was obtained in 46 hours in glass vessels but that no borohydride could be produced in iron or steel vessels (page 8). Since glass apparatus is noticeably attacked by the reactants, inability to utilize ferrous materials constitutes a disadvantage it is desirable to overcome.

A primary object of the present invention is therefore generally to improve the process of Patent 2,534,533. A second object is, specifically, to reduce the time required to obtain suitable yields of borohydrides by the reaction between sodium hydride and boric oxide. A further object of the invention is to develop a method for carrying out the reaction in iron or steel containers. Still further objects of my invention will be evident from the remainder of this specification and from the drawing in which the figure shows, partly in elevation and partly in section, a stainless steel ball mill convenient as a reactor for my process.

An expedient which has been found of great value in improving the patented procedure and which basically constitutes my invention is use of anhydrous boric anhydride. In the preferred embodiment of the invention sodium hydride is reacted with approximately stoichiometric quantities of activated granular boric anhydride. The reactants are preferably milled together in a stainless steel ball mill at a temperature of about 300°–380° C. If the directions given are followed carefully a yield of up to 80% sodium borohydride can be obtained within a reasonable time.

Desirably the boric oxide or anhydride used is prepared according to the method described in Ber., 56, 656–657 (1923). The examples of this specification utilize material freshly prepared by the method of the Berichte article, in the following manner: Boric acid, $H_3BO_3$, was placed in a reactor and the pressure reduced to about 5 mm. of Hg. The reactor was then heated to drive off water, temperature being measured by a thermocouple inserted into the reactor. Water began to appear under the given pressure conditions at about 120° C. and was collected in Dry Ice traps. In one run approximately 204.3 grams of boric acid were charged into the reactor and heated for about one hour, with water appearing first at 120° C. During the heating period the temperature rose slowly to 184° C. but at the end of the hour quite rapidly to 298° C., all the water evidently having been removed. 115 grams $B_2O_3$ were formed while 89.3 grams $H_2O$ were collected in the traps. The $B_2O_3$ thus produced was found to have intumesced greatly, constituting a fluffy mass of white, brittle, granular, hollow spherules, highly reactive in nature. The ball mill described below was quite suitable as a reactor for the production of $B_2O_3$ if rotated slowly and deprived temporarily of the steel balls ordinarily contained therein.

An additional expedient found of special value to the instant process is thorough agitation of the reactants. Agitation prevents undesirable caking of solid materials and permits the reaction to proceed further towards completion than it otherwise would. While any conventional agitation means may be employed, a ball mill has been found particularly advantageous since it comminutes and stirs the solid reactants at one and the same time. A mill suitable for the purposes of this invention is substantially that described in "Industrial and Engineering Chemistry," 43, 1759–1766 (1951) particularly at page 1764, and illustrated in the appended figure.

The figure of this case shows a stainlesss steel reactor 10 containing steel balls 11 and supported by bolts 12 and shaft 13. Shaft 13 is rotatably connected to air motor 14 through appropriate gearing, not shown. Careful machining at flanges 16 permits gas tight connections to be made between reactor 10 and tube 17. Tube 17, also formed of stainless steel, is supported at roller bearing 18 by stand 19. Spherical brass joint 20 makes rotatable but air tight contact with glass adaptor 21, tension springs 22 and 23 holding the adaptor 21 to stand 19 with any desired resilient force. A stoppered reflux condenser 24 may be joined to adaptor 21 with an outlet 25 comprising an exit for gases vented from the system. The free end of adaptor 21 is closed by stopper 26 through which is inserted thermocouple well 27 and gas inlet tube 28. Air motor 14 is held at pivot 29 to stand 30. This stand 30 is rigidly fastened to base plate 31 at a predetermined distance from stand 19. Furnace 32 is supported on base plate 31 and surrounds reactor 10, holes being left in the furnace to admit passage therethrough of shaft 13 and tube 17. Furnace 32 may be made of any convenient heat resistant material. If however discrete units such as magnesia firebricks (not shown) are utilized, the furnace may be easily assembled and disassembled. Heat may be supplied to the reactor 10 from any convenient source such as a small flame playing into the furnace 32.

The operation of the ball mill can be easily understood from the description. In practice the solid reactants were charged into the reactor and the entire system evacuated and subsequently filled with nitrogen, at atmospheric pressure, through inlet tube 17. Bubblers and a Dry Ice trap (not shown) were arranged after the exit for gases to ensure that no oxygen or moisture leaked back into the apparatus. The reactor was heated until the reaction was believed complete, the furnace was dismantled and the product removed. Swinging the ball mill downward by means of pivot 29 may be utilized to expedite removal of the solids if desired.

Further details of the invention will be more easily understood from consideration of the specific examples following.

Example 1

Two moles of sodium hydride and one mole of granular activated boric anhydride were charged into the stainless steel ball mill and heated, while undergoing milling, at a temperature of between 305° and 346° C. for three hours. The product was analyzed and showed a content of 19.6% NaH and 6.75% NaBH$_4$. The figure for the borohydride corresponded to a yield of 42.1%.

Heating was continued for three more hours at a temperature of 331-366° C. The product contained 2.0% NaH and 11.9% NaBH$_4$ for a yield of 74.3% sodium borohydride.

The product in this and subsequent examples was analyzed by means of an Edwards Analyzer, "The Analyst," 71, 521 (1946). Methyl Cellosolve, 2-methoxyethanol, which reacts with sodium hydride but not with the borohydride, was first added to the sample of product and evolved hydrogen measured. Acidified methyl Cellosolve was then added to the sample and the hydrogen again measured.

Example 2

A run was made with a mixture of 2 moles of NaH and 1.1 moles of B$_2$O$_3$ to which was added a heel of material from a previous run containing 0.083 mole of NaH and 0.032 mole of NaBH$_4$. After milling and heating for a total of 10 hours at a temperature in the range of about 300°-360° C. a product showing a yield of 73% was obtained. While the heel may have, to some extent, prevented packing of materials it did not improve the yield.

Example 3

The procedure of Example 1 was repeated except that 3.0 moles of NaH were used with 1.65 moles of granular B$_2$O$_3$. After a total heating and milling period of 7 hours at a temperature of about 300-380° C., a product containing 0.2% of NaH and 12.1% of NaBH$_4$ was found. The yield of sodium borohydride was 80%.

The crude sodium borohydride produced in these runs may be utilized directly as a reducing agent or purified and concentrated. Extracting the borohydride with isopropyl amine in a Soxhlet extractor followed by evaporating the amine and dissolving the residue in absolute ethyl alcohol gives a solution from which the borohydride can be precipitated in about 90% purity.

Various modifications in the above described examples may be made without departing from the spirit of this invention. Hydrogen, for example, may be substituted for nitrogen as a blanket to exclude air and moisture from the reactor. Since hydrogen was always evolved as the reaction proceeded, increase in the partial pressure of hydrogen is actually desirable. Truly inert gases such as helium, argon and neon may also be substituted for the nitrogen. It is, furthermore, not considered imperative that the boric oxide be prepared in the exact manner described above. The preferred preparation in vacuo does not, for example, require a pressure as low as 5 mm. A water aspirator at normal temperatures pulling a vacuum of not less than 30 or 35 mm. serves as a satisfactory pump. In fact, sub-atmospheric pressures at least as high as 100 mm. are acceptable. Temperatures required for the dehydration of the boric acid are of course set by the pressure utilized. Fusion of the material undergoing dehydration should however be avoided. Localized heating which may promote fusion even at reduced pressures is consequently undesirable.

The particle size of the B$_2$O$_3$ is not strictly critical, particularly if the comminution by the ball mill be employed, if anhydrous material be obtained. The undesirability of oxide prepared by fusion of H$_3$BO$_3$ at atmospheric pressure may be due to the difficulty in obtaining complete dehydration in this manner. The reactive spherules obtained by the low pressure dehydration, while preferred, are in like manner not absolutely essential. The size of these spherules may also be allowed to vary with the particles of commercial grade boric oxide used in their preparation, but should average about 2 mm. in diameter. An alternative preparation which may avoid both fusion and production of spherules but which yields satisfactory B$_2$O$_3$ consists in dehydrating granular commercial boric acid in a rotating ball mill by means of a hot air stream at atmospheric pressure. It may be noted that anhydrous B$_2$O$_3$ which has been stored out of contact even with the moisture of the air may be substituted in the reaction with a hydride for freshly prepared material. Still other modifications in procedure will be evident to those skilled in the chemical arts.

It will be seen from the examples given that unexpected and beneficial results have been obtained by the expedients of this invention which consist primarily of the use of active anhydrous boric anhydride and the use of steel reactors. It has for example been possible to obtain acceptable yields in reactors made from ferrous metal, thus obviating the necessity for utilizing fusible glass vessels. It has also been possible to obtain acceptable yields within commercially reasonable periods of time by extremely simple means. These results show accomplishment of the objectives set forth above.

Having now described my invention, I claim:

1. A process for manufacturing sodium borohydride which comprises agitating together, at a temperature of about 300°-400° C., in a ferrous metal reactor and in the substantial absence of air and moisture, sodium hydride and anhydrous boric oxide prepared by dehydrating boric acid without fusion at subatmospheric pressure.

2. The process of claim 1 in which the mole ratio of sodium hydride to boric oxide is about 2:1 and the boric oxide initially constitutes an intumescent mass of brittle, granular, hollow, highly reactive spherules.

References Cited in the file of this patent

UNITED STATES PATENTS

| | | |
|---|---|---|
| 2,465,989 | Sowa | Apr. 5, 1949 |
| 2,534,533 | Schlesinger | Dec. 19, 1950 |
| 2,596,690 | Hurd | May 13, 1952 |

FOREIGN PATENTS

| | | |
|---|---|---|
| 378,469 | Great Britain | Aug. 12, 1932 |
| 482,303 | Great Britain | Mar. 28, 1938 |

OTHER REFERENCES

Schlesinger et al.: "Jour. of the Amer. Chem. Soc.," vol. 75, pp. 205–209 (January 5, 1953).

Mellor: Comprehensive Treatise on Inorganic and Theoretical Chemistry, vol. 5, page 41, Longmans, Green & Co., New York, 1924.

Tiede et al.: "Berichte," vol. 56, pages 656–657, March 1923.

Final Report to the Signal Corps Ground Signal Agency on Contract W-3434-S.C.-174. Delivered to U.S. Dept. of Argiculture Library, June 12, 1946, Figs. 7 and 29 cited, by Schlesinger et al.

Swamer and Hauser: Journal of American Chemical Society, March 1950, vol. 72, page 1355.

Smith's Inorganic Chemistry, 2nd rev. edition, Appleton-Century, New York, 1937, page 668.

Hansley's Industrial and Engineering Chemistry, vol. 43, No. 8, August 1951, p. 1764.